United States Patent
Baucke et al.

(10) Patent No.: US 8,446,835 B2
(45) Date of Patent: May 21, 2013

(54) METHOD AND TERMINATION NODE FOR BUNDLING MULTIPLE MESSAGES INTO A PACKET

(75) Inventors: Stephan Baucke, Milpitas, CA (US);
Jurgen Sauermann, Herzogenrath (DE);
Jörg Bruss, Eschweiler (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 581 days.

(21) Appl. No.: 12/293,664

(22) PCT Filed: Mar. 28, 2006

(86) PCT No.: PCT/EP2006/002805
§ 371 (c)(1),
(2), (4) Date: Aug. 5, 2011

(87) PCT Pub. No.: WO2007/110096
PCT Pub. Date: Oct. 4, 2007

(65) Prior Publication Data
US 2011/0292815 A1    Dec. 1, 2011

(51) Int. Cl.
*H04L 47/10* (2006.01)
(52) U.S. Cl.
USPC ................. 370/252; 370/477; 709/206

(58) Field of Classification Search
USPC ......................... 370/477; 709/206
See application file for complete search history.

(56) References Cited

U.S. PATENT DOCUMENTS

| | | | |
|---|---|---|---|
| 6,407,994 B1 * | 6/2002 | Archer | 370/351 |
| 6,609,157 B2 * | 8/2003 | Deo et al. | 709/247 |
| 6,694,471 B1 * | 2/2004 | Sharp | 714/749 |
| 6,862,298 B1 * | 3/2005 | Smith et al. | 370/516 |
| 7,107,619 B2 * | 9/2006 | Silverman | 726/27 |
| 7,937,257 B2 * | 5/2011 | Arora | 703/20 |

* cited by examiner

*Primary Examiner* — Hassan Kizou
*Assistant Examiner* — Tejis Daya

(57) ABSTRACT

The invention relates to a method and a termination node for bundling multiple messages into a packet having a predetermined maximum size. The total size of messages received from an upper layer is checked if it is large enough to fill the maximum-sized packet. If not, the receipt of further messages is waited for a bundling delay time and if the bundling delay time has expired the messages received during said delay time are bundled into the packet. In order to ensure primarily a maximal bundling efficiency and secondarily a lowest possible delay time for the received messages before they are bundled the bundling delay time is calculated in response to an average arrival rate and an average size of the previously received messages such that the bundling delay time corresponds to an average time to fill the packet of the predetermined maximum size.

5 Claims, 3 Drawing Sheets

METHOD AND TERMINATION NODE FOR BUNDLING MULTIPLE MESSAGES INTO A PACKET

TECHNICAL FIELD

The invention relates to a method for operating a termination node for terminating a transport protocol of a telecommunications network by bundling multiple messages into a packet having a maximum size. Moreover, the invention relates to such a termination node.

BACKGROUND

From the international patent application WO 02/27991 A1 a method for adaptive packet bundling is known. Said application teaches to check system performance parameters, while a system is in operation and to increase or decrease the size of a packet based on said system parameters. Processor utilisation, delay time and jitter are checked as performance parameters for determining the optimal packet size. The delay time is a measure for the time it takes for a packet to travel from a source to a destination. The interval for evaluating the packet size is controlled to prevent system instability and race conditions. The advantage of the method disclosed in that international application is the optimisation of the system performance.

The capability to bundle multiple user messages e.g. into one internet protocol IP-packet as provided by message oriented transport protocols, such as the stream control transmission protocol SCTP may advantageously result in a more efficient transport of the messages. Said advantage results because on one hand the bandwidths efficiency is improved and on the other hand a per-packet-processing is reduced.

The bandwidth efficiency is improved because the number of packets and consequently also the overhead caused by packet headers etc. are reduced if multiple user messages are bundled into one packet. Furthermore, there may be beneficial secondary effects, such as a reduced number of acknowledgements because more data can be acknowledged at a time by the receiver when receiving packets with multiple bundled messages.

The per-packet processing is reduced due to the lower number of packets needed to transport a given amount of user messages. This can significantly ease the load on nodes such as a sender, a receiver or intermediate routers. If any such nodes are CPU limited, it can help to improve the achievable user data throughput.

In order to perform user message bundling, a transport protocol needs to wait for a bundling delay time until multiple messages have been provided by an upper layer, e.g. an application layer before it can assemble and send a packet. To maximize the bandwidth efficiency, the bundling delay time should ideally be sufficiently long to accumulate enough data to fill a packet having a predetermined maximum size, as e.g. determined by the maximum transfer unit MTU in IP-networks. However, waiting for the bundling delay time causes an additional delay time for the individually received messages before they are sent to another node. Hence, the determination of the bundling delay time requires a trade-off between maximizing the bundling efficiency and keeping the additional delay time for the messages low.

Accordingly, bundling strategies may have the disadvantage that the resulting bundling efficiency is too low or the resulting additional delay time for the received messages before being forwarded is too long.

SUMMARY

It is an object of the invention to improve a method and a termination node for bundling messages into a packet such that the bundling efficiency is improved under consideration of the additional delay time.

This object is solved by the method claimed by claim 1. The method is characterized by the steps of determining an average arrival rate and an average size of the received messages before bundling them and calculating the bundling delay time in response to the determined averages for the received messages such that the bundling delay time corresponds to an average time to fill the packet of predetermined maximum size.

Advantageously said method improves the bandwidth efficiency and reduces the additional delay time for the messages. This is achieved by determining the bundling delay time such that it is just long enough on average to fill the maximum sized packet. This results for example in a minimal waiting time for the user of a mobile phone when a telephone call is set-up.

According to a first embodiment the averages are continually updated and the method is continually repeated with the updated average values. Said updating and continual repetition advantageously allows achieving high bandwidth efficiency in combination with a low additional delay time for the messages even if the arrival rates or the sizes of the received messages change over the time.

Preferably, a high bundling efficiency is achieved, if the bundling delay time is calculated as $$D := \min\left(\frac{S_{max}}{\overline{R} \cdot \overline{S}}, D_{max}\right)$$

wherein $S_{max}$ represents the maximum packet size, $\overline{R}$ represents the average message arrival rate, $\overline{S}$ represents the average message size, and $D_{max}$ represents the maximum bundling delay time.

Moreover, calculating the average message arrival rate or the average message size according to a moving average has the advantage, that the averages are adapted after every received message. In that way a precise calculation of the average values and of the bundling delay time in order to achieve maximum bandwidth efficiency becomes possible.

The above identified object of the invention is further achieved by a termination node of a transport protocol of a telecommunications network. The advantages of said termination node substantially correspond to the advantages mentioned above with respect to the claimed method.

Advantageously, the entities of said termination node are embodied in software adapted for execution in a processing unit.

Said termination node is embodied to perform the method according to the present invention.

DETAILED DESCRIPTION OF PREFERRED EMBODIMENTS

Generally, different bundling strategies are conceivable, for example it is possible to perform the bundling based on a variant of the so-called Nagle algorithm. In this case, newly received messages which are too small to fill a maximum-sized packet are held back until either an acknowledgement arrives for an earlier packet or until enough messages have been accumulated to fill the packet. Therefore, the bundling delay time is not fixed in this case, but packet transmissions are clocked out by acknowledgements unless the message arrival rate is high enough to fill the packets before the next acknowledgement arrives. The additional delay time incurred in that case is thus depended on the round-trip time RTT of the network.

It is also possible to hold back the received messages for a predetermined fixed bundling delay time in the hope that enough messages will be accumulated to fill the maximum-sized packet during said bundling delay time unless enough messages have been accumulated before to fill the packet. The bundling delay time is in that case pre-configured or hard-wired in the protocol stack.

As a preferable alternative to these options, the proposed method is now described in more detail by referring to the above-identified figures.

Figure 1:
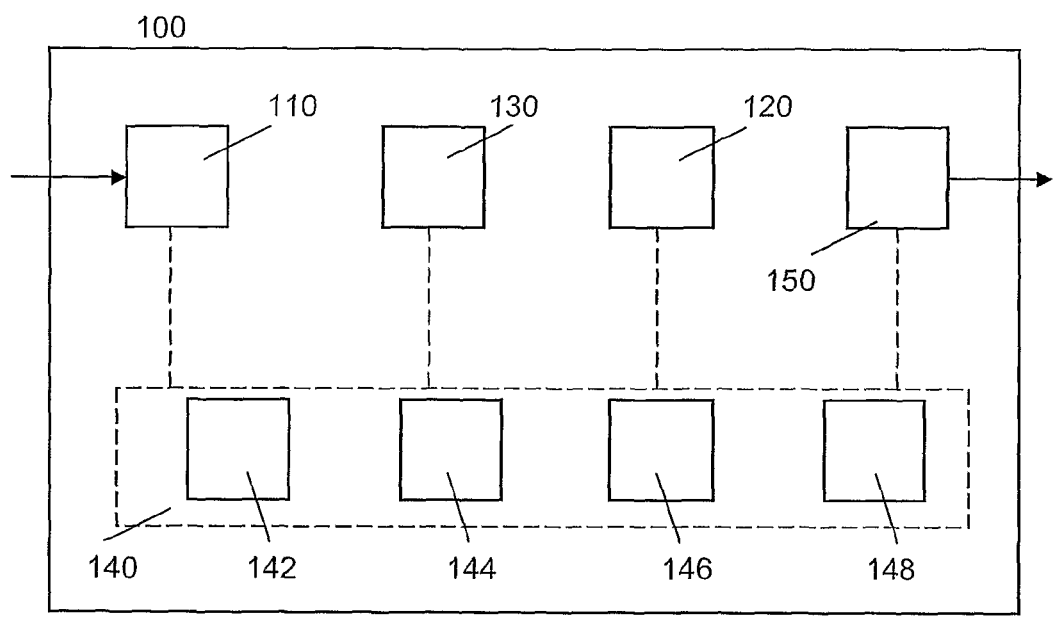
FIG. 1 shows the construction of a termination node according to the present invention.

FIG. 1 shows a termination node 100 of a telecommunications network for terminating a transport protocol. For sending out messages, the termination node 100 is adapted to bundle multiple messages into a packet having a predetermined maximum size. The termination node 100 comprises an interface 110 for receiving the messages from, e.g., an upper layer, a buffer 120 for storing the messages, and an interface 150 for sending data packets, e.g., using a lower layer in the protocol stack. Further, the termination node 100 comprises a processing unit 140 with several entities. In particular said processing unit 140 comprises an entity 142 for checking if the total size of the received messages is large enough to fill the maximum-sized packet, an entity 144 for determining an average arrival rate and average size of the received messages before bundling them and a setting entity 146 for determining a bundling delay time in response to said determined averages of the received messages such that the bundling delay time corresponds to an average time to fill the packet of the predetermined maximum size. A bundling entity 148 is adapted to bundle the messages into the data packets.

Moreover, the termination node 100 comprises a timer 130 controlling the waiting for the receipt of further messages for said calculated bundling delay time if the total size of the received messages is not large enough to fill the packet. Finally, the termination node 100 is adapted to send out the bundled messages from the output buffer 120 to another node of the telecommunications network.

In the following the method for operating the termination node 100 according to FIG. 1 is described in more detail by referring to FIG. 2.

In a first method step S1 the arrival of a new user message from an upper layer is the detected. Subsequently, in a second message step S2 an average arrival rate and an average size of received messages are calculated.

There are several possibilities to calculate said averages. A preferred possibility is to use so-called moving averages because in that case the averages are adapted upon the receipt of any new message. In this way the average values are always adapted to the current rate and size of the newly incoming messages. A preferred embodiment of the moving average calculation is the so-called exponentially weighted moving average method, wherein a newly calculated average for the average arrival rate and/or the average size is calculated according to the following formula:

$$\overline{X} := \alpha \cdot \overline{X}_{old} + (1-\alpha) \cdot X \quad 0 < \alpha < 1 \tag{1}$$

wherein:
$\overline{X}$: represents the newly calculated average;
$\overline{X}_{old}$: represents the previous average;
$X$: represents a new measurement sample; and
$\alpha$: represents a weight determining how quickly the moving average reacts on changes of the measured values.

Other options for calculating the moving average may consider only a limited number of previous measurements.

Preferably, the calculated average values for the average rate and the average size are continuously updated.

After the average arrival rate R and the average size S of the received messages have been calculated the received messages are placed into the output buffer 120 according to step S3. In step S4, the total size of the messages in the output buffer is calculated. Subsequently, the entity 142 checks in step S5 if the calculated total size is already large enough to fill the maximum-sized packet. If not, the setting entity 146 calculates the bundling delay time D from the previously calculated or updated average arrival rate R and average size S according to method step S6.

The bundling delay time D may e.g. be set as follows:

$$D := \min\left(\frac{S_{max}}{\overline{R} \cdot \overline{S}}, D_{max}\right) \tag{2}$$

wherein:
$S_{max}$: represents the maximum-sized the packet size, excluding overhead [bytes];
$\overline{R}$: represents the average message arrival rate [1/s];
$\overline{S}$: represents the average message size [bytes]; and
$D_{max}$: represents the maximum bundling delay time [s].

Other options are possible which use for example different units of measurement for the variables or in which $D_{max}$ can be variable.

According to equation (2) high bandwidth efficiency is achieved with respect to the criterion of the additional delay time for the received packets. Expressed in other words, equation (2) ensures, that the bundling delay time is calculated such that a sender will on average wait just long enough to accumulate a maximum-sized packet worth of messages. The parameter $D_{max}$ representing the maximum bundling delay time ensures that the delay time is limited even in the case of low message rates or sizes.

Figure 2:
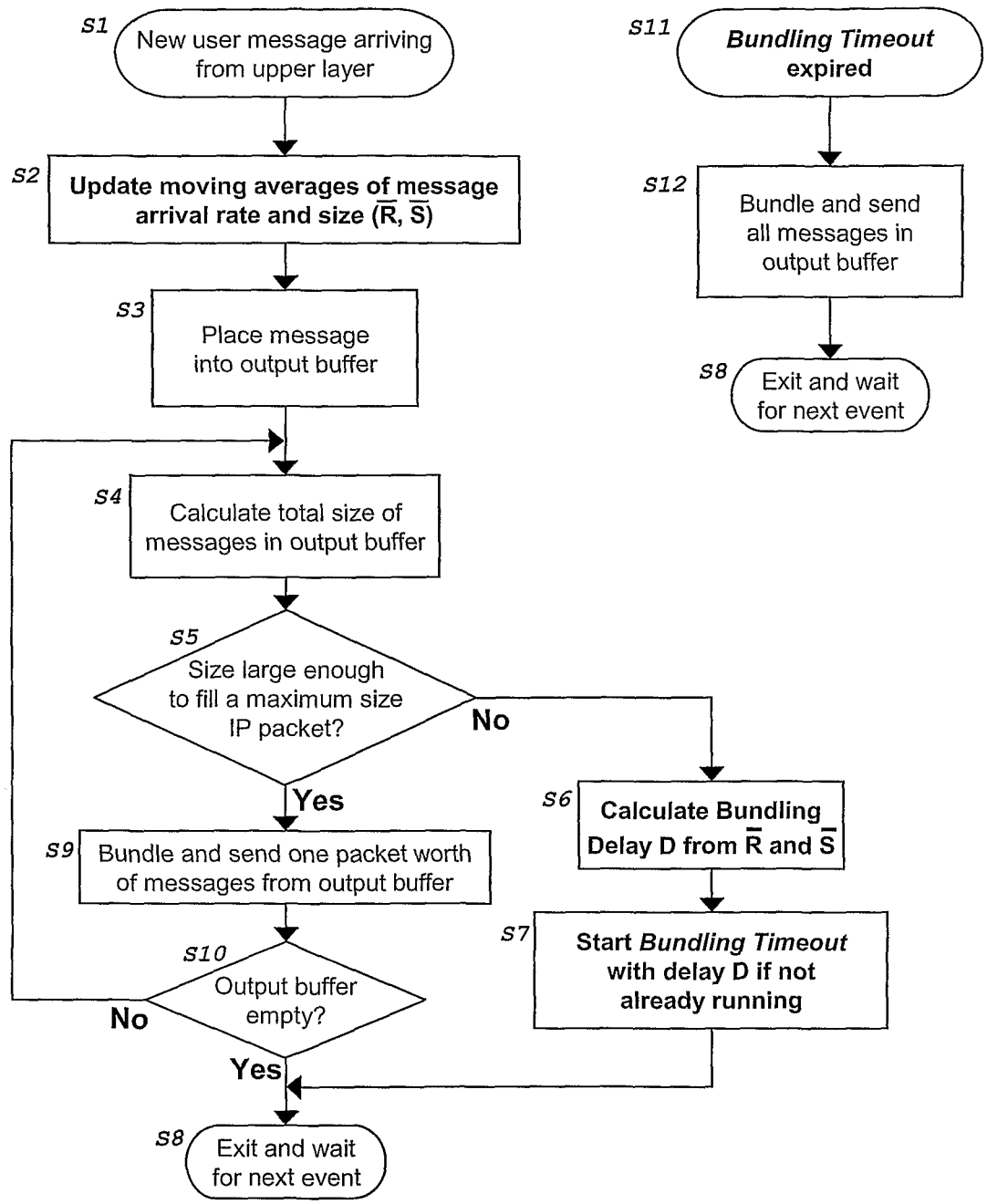
FIG. 2 shows a flowchart illustrating the method of the present invention.

If the method or flowchart of FIG. 2 is run for the first time or if the timer was started during a previous iteration of the method but has expired, i.e. if timer 130 is not yet running, the timer 130 is started according to method step S7 and the method then proceeds to method step S8 to wait for the receipt of further messages during the previously started bundling delay time D.

After the receipt of a second or still further message the flowchart is run a further time and the average arrival rate and the average arrival size are updated in step S2. Method steps S3, S4 and S5 are repeated and if the total size is not yet— even under consideration of the newly received message— large enough to fill the maximum size packet, the bundling delay time D is updated according to method step S6 again. Due to a check whether the timer is already running, the timer 130 simply runs on and the method proceeds to method step S8 as long as the previously started bundling delay time interval has not yet expired.

However, in the case that the expiration of the bundling delay time interval has been detected in step S11, step S12 is executed. In that case, the bundling delay time has expired before the maximum-sized packet could be filled. The waiting period is stopped to avoid an unacceptable long delay time for the received messages. More specifically, the messages which have been received during the bundling delay time interval in the output buffer 120 are bundled into a packet and sent over interface 150 to a destination node within the telecommunications network. After the messages have been bundled and sent out the buffer is cleared and emptied, optionally after reception of an acknowledgement for the packet. Subsequently, the method goes back to method step S8 and waits for the reception of new messages.

Depending on the transport protocol, additional conditions for exiting the delay time interval of the proposed method are possible. For example, a data packet may also be sent out immediately if an association is closed in which the messages are sent. Additional conditions may be indicated by other layers in the protocol stack or a recipient of the messages.

Up to now, the flowchart has only been discussed for the case, that the total size of the messages currently in the output buffer 120 is not large enough to fill the maximum sized packet. In the opposite case, i.e. if there are enough messages in the output buffer to fill the packet as determined in method step S5, the messages are bundled into the packet and sent out from the output buffer 120 according step S 9. Subsequently, in method step S10 it is checked if the buffer 120 is empty or not. If not, i.e. if there are still messages within the output buffer, at least steps S4 and S5 are repeated. However, if in method step S10 it is detected that the output buffer is empty the method goes to method step S8 and waits for the receipt of further messages from an upper layer.

Preferably, the method and the entities of the termination node are embodied in software adapted for execution in the processing unit 140.

Figure 3:
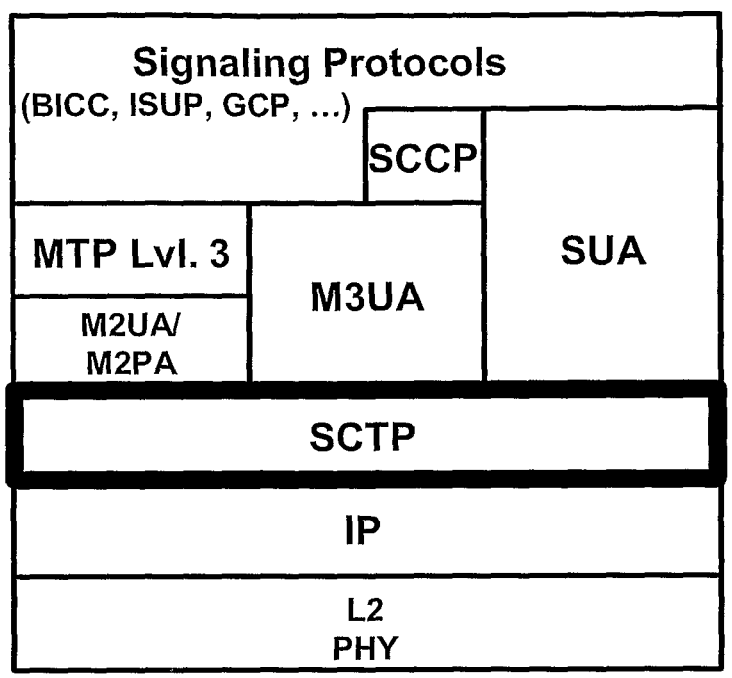
FIG. 3 shows a protocol stack in which the invention can be embodied.

In an option, the method is carried out in the protocol stack as shown in FIG. 3. The depicted protocol stack is a widely accepted solution for the transport of important signalling protocols such as BICC (Bearer Independent Call Control), ISUP (ISDN User Part) and H.248 over IP-based networks, for example in mobile core networks. As operators are migrating towards IP-based transport networks, the use of this protocol stack is scaled up accordingly. This places high throughput requirements on the performance particularly of central nodes such as MSC Servers (MSC-S) as termination nodes, which may have to process thousands or tens of thousands of signalling messages per second. Consequently, the protocol stack is preferred for applying the method of the present invention.

SCTP is the transport layer protocol within the protocol stack. Also, as was mentioned earlier, SCTP has the ability to perform bundling of multiple user messages into IP packets, reducing overhead and the number of IP packets required to transport the user messages. By enabling an efficient implementation of message bundling, the invention therefore has the potential to alleviate a significant performance bottleneck in central processing nodes while keeping the delay penalty as small as possible.

The above embodiments admirably achieve the objects of the invention. However, it will be appreciated that departures can be made by those skilled in the art without departing from the scope of the invention which is limited only by the claims.

The invention claimed is:

1. A method of operating a node for terminating a transport protocol of a communications network by bundling multiple messages into a packet having a predetermined maximum size, the method comp sir the steps of:
   receiving said messages from an upper layer of the transport protocol;
   determining an average arrival rate and an average size of the received messages before bundling them;
   checking if the total size of the received messages is large enough to fill the packet;
   waiting for the receipt of further messages for a bundling delay time if the total size of the received messages is not large enough to fill the packet of predetermined size, wherein the bundling delay time is calculated from the determined average arrival rate and avers size of the received messages such that the bundling delay time corresponds to an average time to fill the packet of the predetermined maximum size irrespective of variations in arrival rates and sizes of received messages; and
   bundling the received messages into the packet when the bundling delay time has expired.

2. The method according to claim 1, wherein the determination of the average arrival rate and average size of received messages is continually updated and the method is continually repeated with the updated average values.

3. The method according to claim 1, wherein the bundling delay time D is calculated as:

$$D := \min\left(\frac{S_{max}}{\overline{R} \cdot \overline{S}}, D_{max}\right)$$

wherein:
$S_{max}$: represents the maximum packet size;
$\overline{R}$: represents the average message arrival rate;
$\overline{S}$: represents the average message size; and
$D_{max}$: represents the maximum bundling delay time.

4. The method according to claim 1, wherein at least one of the average message arrival rate and the average message size is iteratively calculated according to a moving average.

5. The method according to claim 1, wherein the transport layer protocol is the stream control transmission protocol (SCTP).

* * * * *